(12) United States Patent
Quinn et al.

(10) Patent No.: US 9,004,321 B2
(45) Date of Patent: Apr. 14, 2015

(54) REUSABLE POUR-ON GUN SYSTEM

(75) Inventors: Kimberly Quinn, Kenansville, NC (US); Mitchell D. Rivenbark, Clinton, NC (US); James B. Holland, Clinton, NC (US)

(73) Assignee: Neogen Corporation, Lansing, MI (US)

( * ) Notice: Subject to any disclaimer, the term of this patent is extended or adjusted under 35 U.S.C. 154(b) by 356 days.

(21) Appl. No.: 13/315,391

(22) Filed: Dec. 9, 2011

(65) Prior Publication Data

US 2012/0145745 A1 Jun. 14, 2012

Related U.S. Application Data

(60) Provisional application No. 61/421,846, filed on Dec. 10, 2010.

(51) Int. Cl.
| | | |
|---|---|---|
| B67D 7/58 | (2010.01) | |
| B67D 3/00 | (2006.01) | |
| G01F 11/00 | (2006.01) | |
| E03C 1/10 | (2006.01) | |
| A23G 9/28 | (2006.01) | |
| F16N 3/08 | (2006.01) | |
| B65D 47/32 | (2006.01) | |
| B05B 11/00 | (2006.01) | |

(52) U.S. Cl.
CPC .. *A23G 9/28* (2013.01); *F16N 3/08* (2013.01); *B65D 47/32* (2013.01); *E03C 1/10* (2013.01); *B05B 11/3011* (2013.01)

(58) Field of Classification Search
USPC ........... 222/383.3, 383.1, 324, 325, 326, 327, 222/481.5, 481, 526, 529, 537, 532, 375, 222/464.1, 630, 631, 632, 633, 482, 372, 222/490, 400.5, 401, 400.7, 400.8, 207, 222/527, 478, 568; 604/187, 191, 218, 223, 604/227, 207–211; 220/289; 137/218, 217, 137/216.1; 285/239, 13, 12, 924
See application file for complete search history.

(56) References Cited

U.S. PATENT DOCUMENTS

| | | | | | |
|---|---|---|---|---|---|
| 2,557,246 | A | * | 6/1951 | Ziherl | 417/547 |
| 3,162,333 | A | * | 12/1964 | Davidson | 222/207 |
| 3,393,840 | A | * | 7/1968 | Sundholm | 222/324 |
| 3,633,613 | A | * | 1/1972 | Julow | 137/512.3 |
| 3,661,174 | A | * | 5/1972 | Cripe | 137/512.3 |
| 3,773,211 | A | * | 11/1973 | Bridgman | 220/495.06 |
| 3,807,445 | A | * | 4/1974 | McPhee | 137/557 |
| 3,878,972 | A | * | 4/1975 | Por | 222/207 |
| 3,951,164 | A | * | 4/1976 | Crist | 137/218 |
| 4,059,113 | A | * | 11/1977 | Beinsen et al. | 53/428 |
| 4,340,157 | A | * | 7/1982 | Darner | 222/211 |
| 4,671,786 | A | * | 6/1987 | Krug | 604/6.1 |
| 4,953,584 | A | * | 9/1990 | Vegso | 137/218 |
| 5,037,399 | A | * | 8/1991 | Reichert et al. | 604/184 |
| 5,992,690 | A | * | 11/1999 | Tracy | 222/79 |
| 5,996,631 | A | * | 12/1999 | Thronton | 137/854 |
| 6,554,161 | B2 | * | 4/2003 | Main | 222/43 |
| 6,648,003 | B2 | * | 11/2003 | Weber et al. | 137/218 |
| 7,543,599 | B2 | * | 6/2009 | Cover | 137/218 |
| 7,793,801 | B2 | * | 9/2010 | Drummond | 222/179 |

* cited by examiner

*Primary Examiner* — Kevin P Shaver
*Assistant Examiner* — Stephanie E Williams
(74) *Attorney, Agent, or Firm* — Honigman Miller Schwartz and Cohn LLP; Noel E. Day; Jonathan P. O'Brien

(57) ABSTRACT

A reusable pour-on gun system is disclosed that is comprised of a pour-on gun component that does not need an inlet valve, a cap assembly including a one-way valve system, the cap assembly adapted to be coupled to a liquid reservoir container, and a hose component coupled on one end to the pour-on gun component and on the other end to the cap assembly.

12 Claims, 4 Drawing Sheets

REUSABLE POUR-ON GUN SYSTEM

CROSS-REFERENCE TO RELATED APPLICATIONS

This application is related to and claims the benefit of U.S. Provisional Application 61/421,846 filed Dec. 10, 2010 entitled, "Reusable Pour-On Gun System".

SUMMARY

A reusable pour-on gun system is disclosed that is comprised of a pour-on gun component that does not need an inlet valve, a cap assembly including a one-way valve system, the cap assembly adapted to be coupled to a liquid reservoir container, and a hose component coupled on one end to the pour-on gun component and on the other end to the cap assembly.

DETAILED DESCRIPTION

Figure 1:
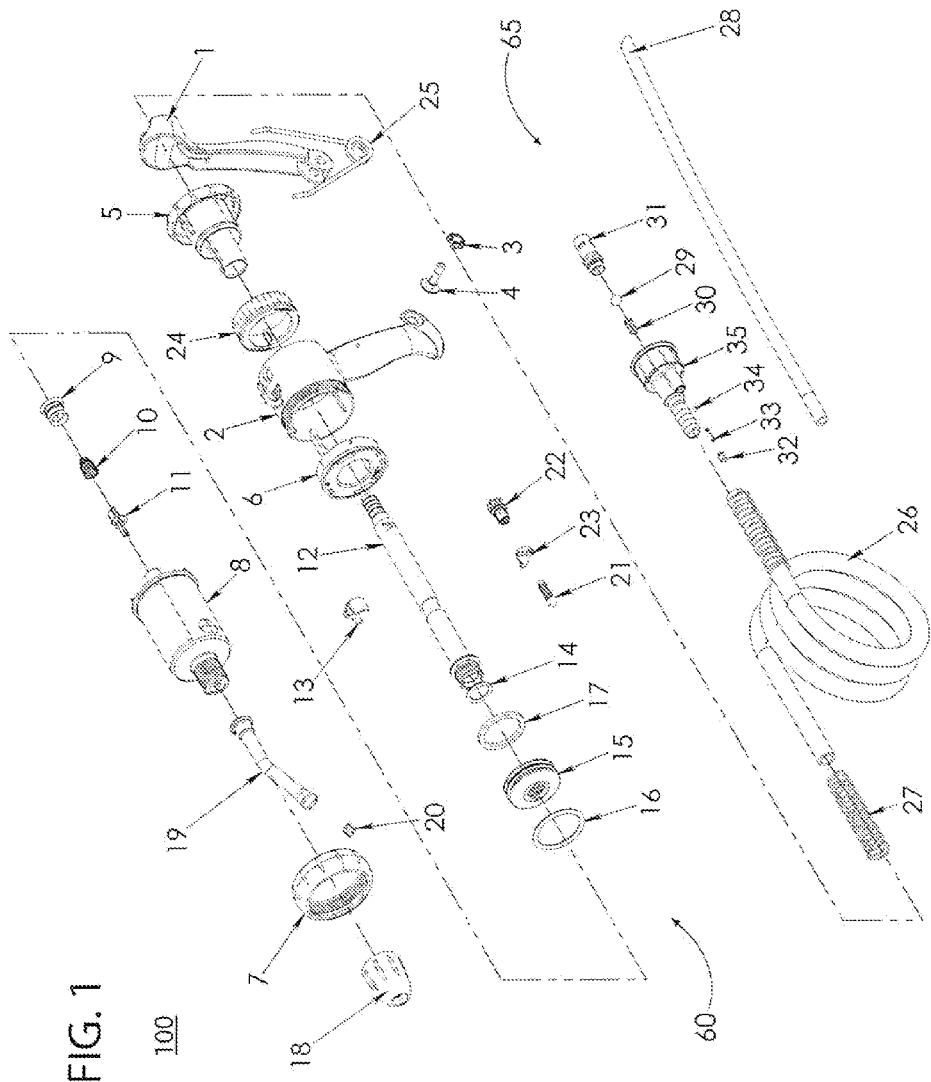
FIG. 1 is an exploded parts view of a pour-on gun component and cap assembly system according to an embodiment.

Table I is a parts list for all of the Figures referenced herein.

TABLE I

| Reference No./Part Description |
|---|
| 1—Rear Handle |
| 2—Front Handle |
| 3—Female Axle Pin |
| 4—Male Axle Pin |
| 5—Adjuster |
| 6—Staircase |
| 7—Barrel Collar |
| 8—Barrel |
| 9—Outlet Valve Seat |
| 10—Outlet Valve |
| 11—Outlet Spring |
| 12—Plunger |
| 13—Rotating Rib |
| 14—Plunger O-Ring |
| 15—Piston |
| 16—Piston O-Ring |
| 17—Wiper Washer |
| 18—Nozzle Cap |
| 19—Angle Nozzle |
| 20—Nozzle Star Tip |
| 21—Handle Spring Adjustment Stem |
| 22—Handle Spring Adjustment Collar |
| 23—Handle Spring Adjustment Retainer |
| 24—Clicker |
| 25—Handle Spring |
| 26—Draw Tube |
| 27—Hose Armor Spring |
| 28—Reservoir Draw Tube |
| 29—Cap Outlet Check Ball |
| 30—Cap Outlet Spring |
| 31—Draw Tube Coupling |

TABLE I-continued

| Reference No./Part Description |
|---|
| 32—Vent Check Ball Seat |
| 33—Vent Check Ball |
| 34—Vent Check Ball Spring |
| 35—Cap Housing |

A reusable pour-on gun system is disclosed that is comprised of a pour-on gun component that does not have an inlet valve, a cap assembly adapted to be coupled to a liquid reservoir, and a hose component coupled on one end to the pour-on gun component and on the other end to the cap component.

Some pour-on gun systems utilize a dual valve to keep the flow of fluid checked in one direction. This may be achieved through the use of an inlet valve and an outlet valve that work in combination with one another along with a piston pump within the pour-on gun itself. In the embodiments disclosed herein, the inlet valve has been removed from the pour-on gun component of the system and placed in the cap assembly. The cap assembly may be coupled to the pour-on gun component by a length of tubing. The cap assembly may also be coupled with a liquid reservoir. Because the inlet valve has been relocated into the cap assembly, the pour-on gun may only be operable with the cap assembly to ensure fluid is checked in one direction.

In one embodiment, the liquid reservoir may be oriented in an upright position. The upright position may necessitate a reservoir draw tube that spans from an opening in the reservoir where the cap assembly may be coupled down to the bottom of the reservoir.

In another embodiment, the liquid reservoir may be oriented in an inverse position such that the cap assembly, once coupled with the reservoir opening may use gravity to feed the liquid within the reservoir into the cap assembly.

In one embodiment, the coupling between the draw tubing and the cap component may be achieved using a barbed configuration.

In another embodiment, the coupling between the draw tubing and the cap component may be achieved using a protruding annular ring configuration.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 is an exploded parts view of a pour-on gun component and cap assembly system 100 according to an embodiment. The pour-on gun component 60 of the system 100 may be comprised of parts labeled 1-25. A hose component may be comprised of parts labeled 26-28. A cap assembly 65 of the system 100 may be comprised of parts labeled 29-35.

The pour-on gun component 60 may comprise a rear handle 1 and a front handle 2 having a handle spring 25 disposed therebetween and coupled together by cooperating female 3 and male 4 axle pins. The rear handle 2 may include a cylindrical top portion. An adjuster may be cooperatively coupled with a clicker 24 to fit within one end of the cylindrical top portion of rear handle 2. A staircase component 6 may fit within the other end of the cylindrical portion of the rear handle 2. A plunger 12 may fit through the staircase component 6, cylindrical top portion of rear handle 2, clicker 24, and adjuster 5. One end of the plunger may be barbed and adapted to accept an end of a draw tube 26. The plunger 12 may include a rotating rib 13 clipped about its outside surface. The plunger 12 is bored through to allow for the flow of liquid received from the draw tube 26. The other end of plunger 12 may be fitted with a plunger O-ring 14.

A piston assembly comprising a piston 15 and a piston O-ring 17 may be cooperatively coupled to the plunger 12. The plunger 12 and piston assembly 15, 16 are adapted to fit snugly within a barrel 8. The barrel 8 may comprise a cylinder having one broad open end adapted to receive the piston 15 and a threaded protruding narrow open. A barrel collar 7 may fit about the outer surface of barrel 8 to couple the barrel 8 to the top cylinder portion of rear handle 2. The protruding narrow open end of barrel 8 may be adapted to receive an outlet valve assembly comprised of an outlet valve seat 9, an outlet valve 10, and an outlet spring 11. The outlet valve seat 9 receives the outlet valve 10 and outlet valve spring 11 and fits securely within the protruding narrow open end of barrel 8 such that outlet valve spring 11 applies pressure against the outlet valve 10 to keep it firm against the outlet valve seat 9.

A nozzle 19 may be held in place against the protruding narrow open end of barrel 8 by means of a nozzle cap 18 that may be threaded to cooperatively engage the threads of the protruding narrow open end of barrel 8.

The cap assembly 65 may comprise a cap housing 35 adapted to be coupled to a liquid reservoir container 70 on one end and adapted to be coupled to a hose forming a draw tube 26 on the other end. The cap housing 35 may include a vent system comprising a vent check ball seat 32, a vent check ball 33, and a vent check ball spring 34 that are cooperatively oriented and seated within a bored out area of the cap housing 35. The cap housing 35 may also include a one way valve system comprised of a cap outlet check ball 29, a cap outlet spring 30, and a draw tube coupling 31 which may serve a dual function. One function of the draw tube coupling 31 may be to provide a coupling mechanism (e.g., a draw tube barb) for a reservoir draw tube 28. The other end of the draw tube coupling may function as a draw tube seat for cap outlet check ball 29. The draw tube coupling 31 is bored through to allow liquid from the reservoir 70 to pass.

Liquid may pass only when the cap outlet check ball 29 does not fully obstruct the bored opening of the draw tube coupling 31. This only occurs when a vacuum force created by manipulation of the pour-on gun component 60 is able to pull the cap outlet check ball 29 sufficient to compress cap outlet spring 30 enough to create an opening between the cap outlet check ball 29 and the draw tube coupling 31. When no vacuum force is applied to the cap outlet check ball 29, it will remain cooperatively seated against the draw tube coupling 31 blocking the liquid from escaping the reservoir 70 creating a one-way valve mechanism. In one embodiment, the draw tube seat and draw tube barb are separate components. In another embodiment, the draw tube seat and draw tube barb may be combined into a single draw tube coupling 31 component.

Figure 2:
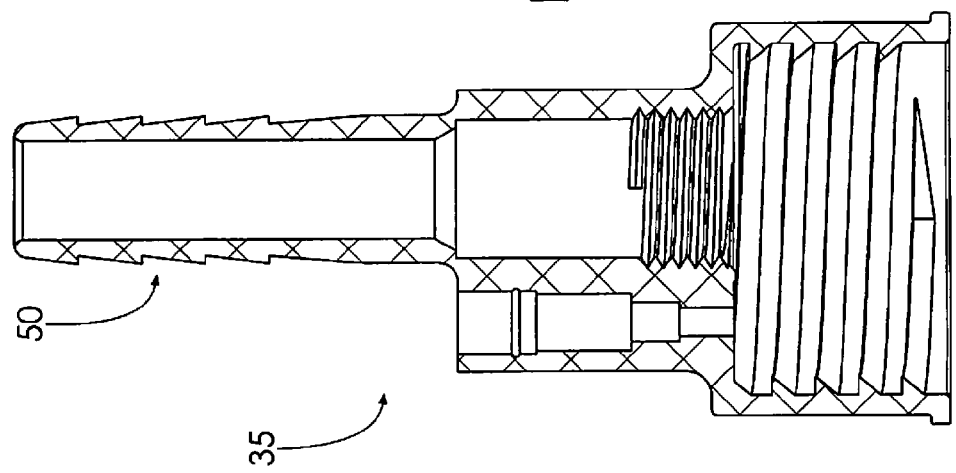
FIG. 2 is a more detailed perspective and cross-sectional view of the cap assembly according to one embodiment.

FIG. 2 is a more detailed perspective and cross-sectional view of the cap housing 35 according to one embodiment. In this embodiment, the top of the cap housing 35 includes a barbed portion 50 adapted to receive and hold the draw tube 26. The draw tube 26 fits over the barbed portion 50 and conforms its interior surface to barbs of barbed portion 50 to create a snug seal between the draw tube 26 and the cap housing 35.

Figure 3:
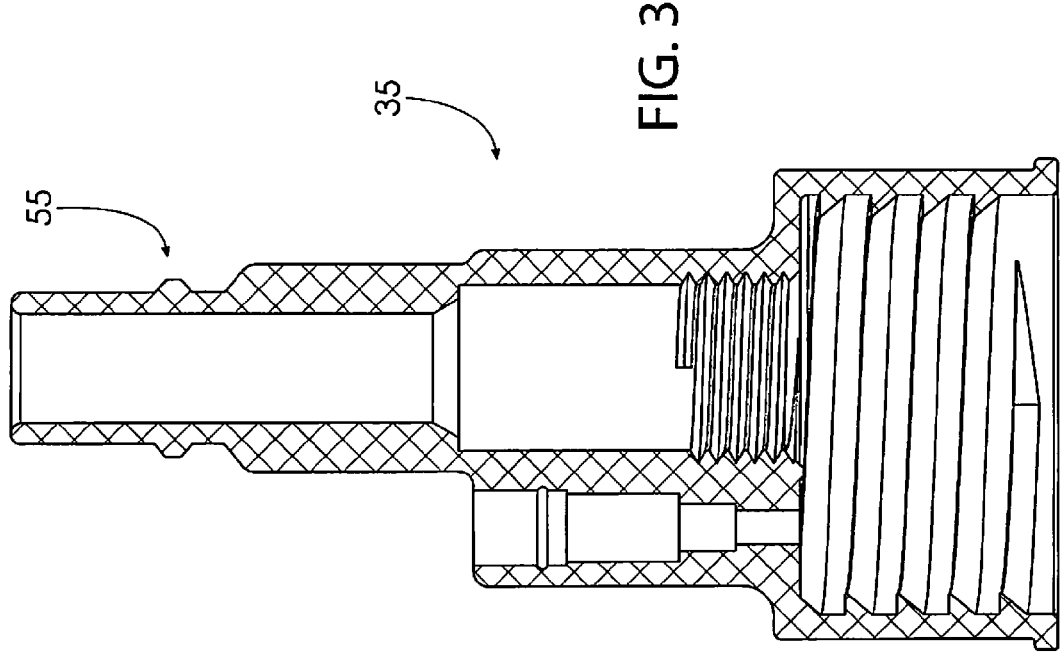
FIG. 3 is a more detailed perspective and cross-sectional view of the cap assembly according to another embodiment.

FIG. 3 is a more detailed perspective and cross-sectional view of the cap housing 35 according to another embodiment. In this embodiment, the top of the cap housing 35 includes a protruding annular ring portion 55 adapted to receive and hold the draw tube 26. The draw tube 26 fits over the annular ring portion 55 and conforms its interior surface to the protruding annular ring 55 to create a snug seal between the draw tube 26 and the cap housing 35.

Figure 4:
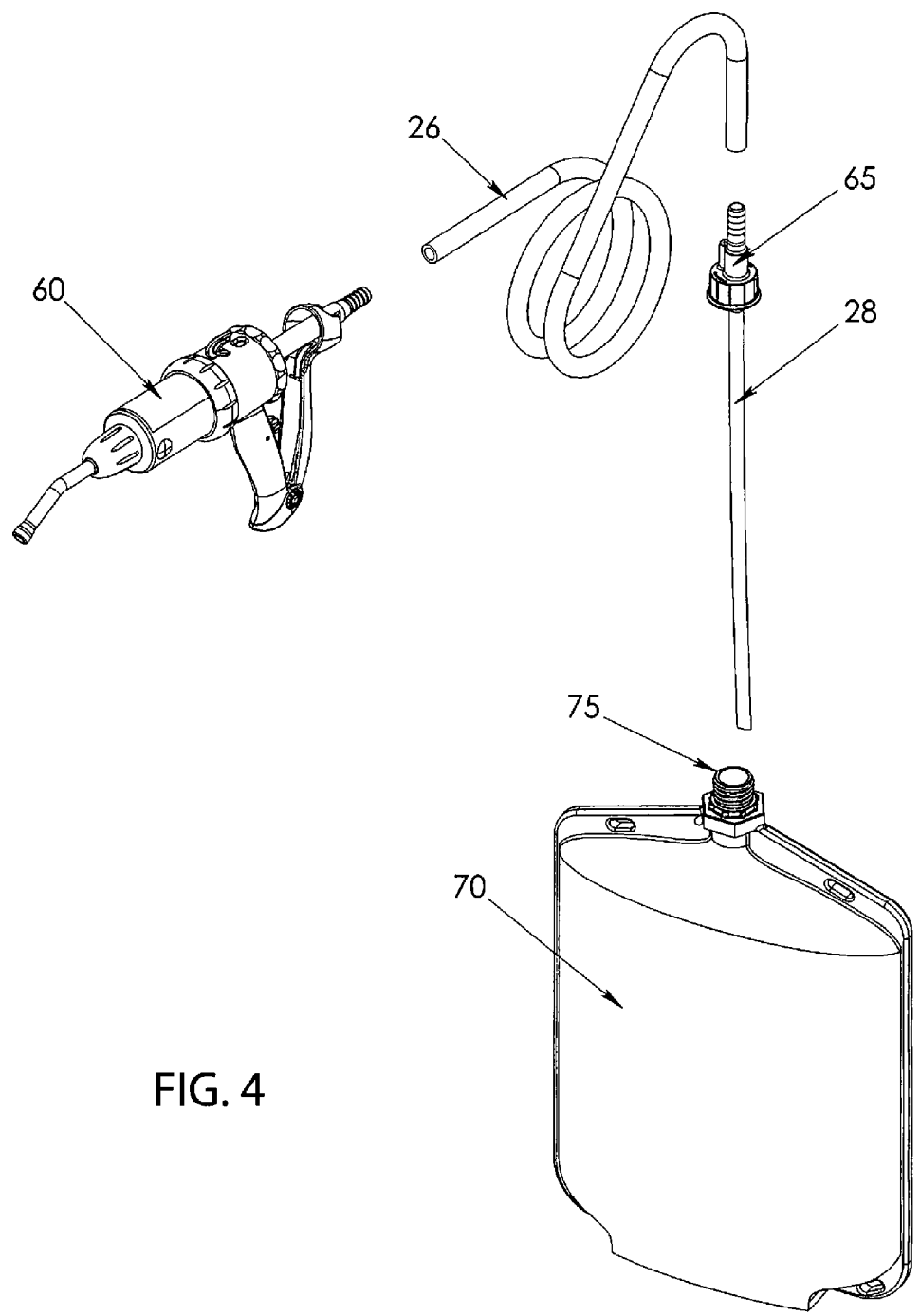
FIG. 4 illustrates the pour-on gun and cap assembly attached to a reservoir component according to one embodiment.

FIG. 4 illustrates the pour-on gun component 60 and cap assembly 65 attached to a reservoir component 70 according to an upright embodiment. The pour-on gun component may be coupled with the cap assembly 65 by means of draw tube 26. One end of the cap housing 35 of cap assembly 65 is threaded and adapted to couple to a corresponding threaded portion 75 of the reservoir 70. The reservoir 70 may be oriented in an upright position such that the reservoir opening is at the upper end of the reservoir 70. This may necessitate the use of a reservoir draw tube 28 that fits in the reservoir 70 and extends all the way to the bottom of the reservoir so that liquid may be drawn from the bottom of the reservoir 70 out the cap assembly 65 and into the pour-on gun component 60 during operation.

Figure 5:
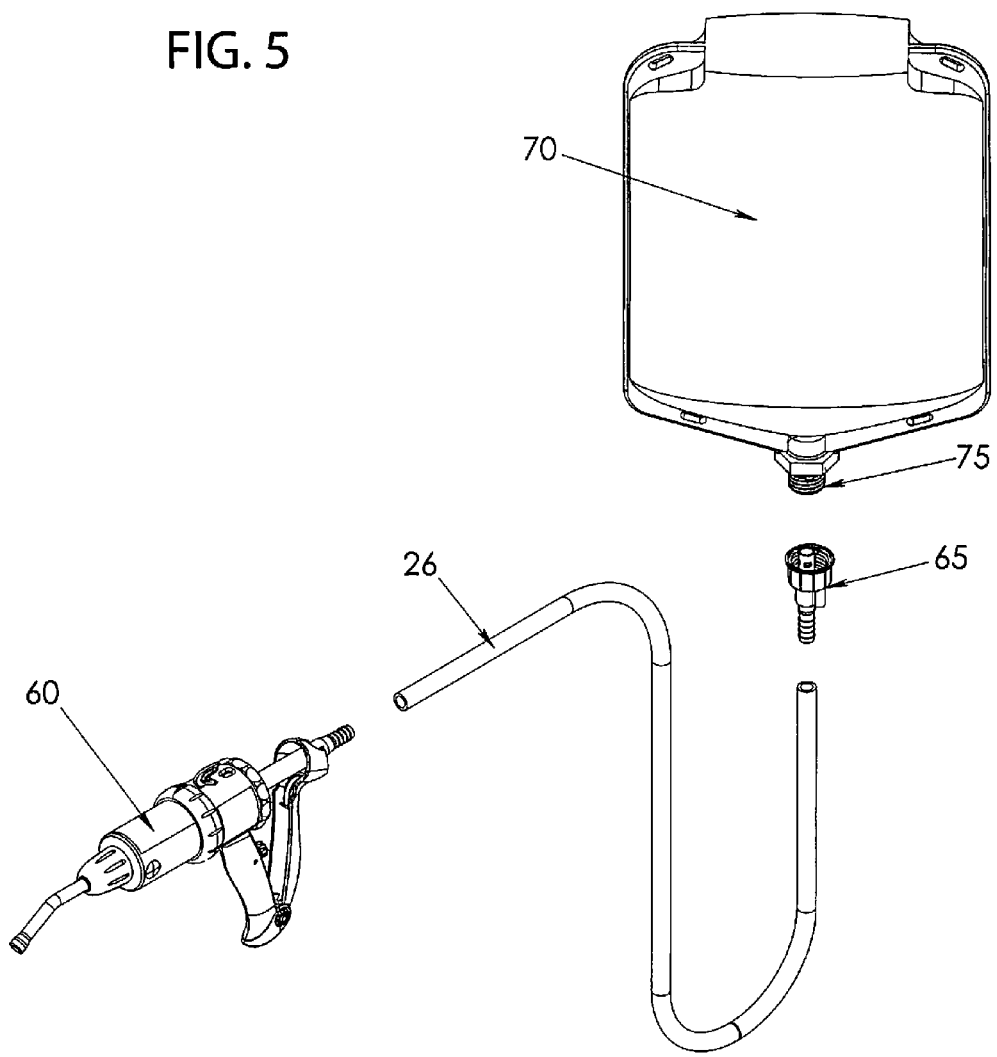
FIG. 5 illustrates the pour-on gun and cap assembly attached to a reservoir component according to another embodiment.

FIG. 5 illustrates the pour-on gun component 60 and cap assembly 65 attached to a reservoir component 70 according to an inverted embodiment. The pour-on gun component may be coupled with the cap assembly 65 by means of draw tube 26. One end of the cap housing 35 of cap assembly 65 is threaded and adapted to couple to a corresponding threaded portion 75 of the reservoir 70. The reservoir 70 may be oriented in an inverted position such that the reservoir opening faces downward. In this configuration, liquid may be drawn directly from the reservoir 70 out the cap assembly 65 and into the pour-on gun component 60 during operation without needing an additional reservoir draw tube 28.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain- English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A pour-on gun system, comprising:
   a pour-on gun component including a barrel and an outlet valve assembly disposed within an open end of the barrel wherein the pour-on gun component further includes a nozzle coupled against the open end of the barrel, wherein the pour-on gun component further includes a plunger having a distal end and a proximal end, wherein the distal end of the plunger is fitted within the barrel;
   a draw tube having a distal end and a proximal end, wherein the distal end of the draw tube is coupled to the proximal end of the plunger; and
   a cap assembly coupled to the proximal end of the draw tube.

2. The pour-on gun system of claim 1, wherein an outer surface of the cap housing defines
   a barbed portion configured for coupling the draw tube to the outer surface of the cap housing.

3. The pour-on gun system of claim 1, wherein an outer surface of cap housing defines
   an annular ring portion configured for coupling the draw tube to the outer surface of the cap housing.

4. The pour-on gun system of claim 1, wherein the pour-on gun component includes an outlet valve system but no inlet valve system.

5. The pour-on gun system of claim 1, wherein the outlet valve assembly includes
   an outlet valve seat,
   an outlet valve, and
   an outlet spring, wherein the outlet valve seat receives the outlet valve and the outlet valve spring.

6. The pour-on gun system of claim 1 further comprising:
   a reservoir including a threaded opening adapted to receive a threaded opening of the cap housing.

7. The pour-on gun system of claim 6, wherein the cap assembly further includes a one way valve system, wherein the one way valve system comprises:
   a cap outlet check ball;
   a cap outlet spring; and
   a cap outlet check ball seat having a first open end and a second open end, wherein the cap outlet check ball seat is operative to seat the cap outlet check ball at the first open end, wherein the one way valve system is operative to allow the flow of liquid in one direction from the reservoir to the pour-on gun component.

8. The pour-on gun system of claim 7, further comprising:
   a vent system including: a vent check ball seat, a vent check ball, and a vent check ball spring, wherein the vent check ball seat, the vent check ball and the vent check ball spring are cooperatively oriented and seated within a bored out area of the cap housing.

9. The pour-on gun system of claim 6, wherein the reservoir is threadingly-coupled to the threaded opening of the cap housing, wherein the reservoir is oriented in an upright position relative to the cap housing.

10. The pour-on gun system of claim 9, wherein the cap outlet check ball seat includes a draw tube coupling.

11. The pour-on gun system of claim 10 further comprising:
    a reservoir draw tube having first open end and a second open end, wherein the first open end is coupled with the draw tube coupling, wherein the reservoir draw tube extends substantially the length of the reservoir.

12. The pour-on gun system of claim 6, wherein the reservoir is threadingly-coupled to the threaded opening of the cap housing, wherein the reservoir is oriented in an inverted position relative to the cap housing.

* * * * *